United States Patent [19]
Bowerman et al.

[11] Patent Number: 5,647,815
[45] Date of Patent: Jul. 15, 1997

[54] DIFFERENTIAL WITH BIAS CONTROL

[75] Inventors: Ward E. Bowerman, Rochester, N.Y.;
Paolo Sacchettini, Brussels, Belgium

[73] Assignee: Zexel Torsen Inc., Rochester, N.Y.

[21] Appl. No.: 523,649

[22] Filed: Sep. 5, 1995

[51] Int. Cl.[6] .................................................. F16H 48/22
[52] U.S. Cl. .................................................. 475/249; 475/252
[58] Field of Search ................................ 475/248, 249, 475/252

[56] References Cited

U.S. PATENT DOCUMENTS

| | | |
|---|---|---|
| 1,481,889 | 1/1924 | Carhart . |
| 1,556,101 | 10/1925 | Goodhart ........................... 475/249 |
| 2,859,641 | 11/1958 | Gleasman . |
| 3,343,429 | 9/1967 | Frost . |
| 3,375,736 | 4/1968 | Saari . |
| 4,191,071 | 3/1980 | Gleasman et al. . |
| 4,805,487 | 2/1989 | Pedersen . |
| 4,890,511 | 1/1990 | Pedersen . |
| 5,122,101 | 6/1992 | Tseng ................................. 475/252 |
| 5,194,054 | 3/1993 | Amborn et al. .................... 475/249 |
| 5,217,416 | 6/1993 | Dick .................................. 475/150 |
| 5,221,238 | 6/1993 | Bawks et al. ...................... 475/252 |
| 5,232,415 | 8/1993 | Brewer et al. ..................... 475/227 |
| 5,292,291 | 3/1994 | Ostertag ............................ 475/252 |
| 5,362,284 | 11/1994 | Brewer .............................. 475/249 |
| 5,415,601 | 5/1995 | Cilano ............................... 475/252 |
| 5,458,547 | 10/1995 | Teraoka et al. ................... 475/249 |
| 5,529,547 | 6/1996 | Okuda et al. ..................... 475/249 |

FOREIGN PATENT DOCUMENTS

| | | |
|---|---|---|
| 1262162 | 10/1986 | U.S.S.R. .......................... 475/249 |
| 1451358 | 9/1976 | United Kingdom . |
| 2229502 | 9/1990 | United Kingdom . |

Primary Examiner—Charles A. Marmor
Assistant Examiner—Sherry Lynn Estremsky
Attorney, Agent, or Firm—Eugene Stephens & Associates

[57] ABSTRACT

An automotive differential (10) is modified to provide better control over torque transfers between a housing (12) and a pair of output shafts (16 and 18), as well as torque transfers between the output shafts (16 and 18). Friction modifiers (66 and 86) are located at various end faces of side gears (30 and 32) coupled to the output shafts (16 and 18) for varying bias ratios in opposite directions of torque transfer between output shafts (16 and 18) independently of directions of torque transfers between the housing (12) and the output shafts (16 and 18).

29 Claims, 4 Drawing Sheets

DIFFERENTIAL WITH BIAS CONTROL

TECHNICAL FIELD

The invention relates to gear differentials used in vehicle drive trains for dividing torque between relatively rotatable output shafts.

BACKGROUND OF INVENTION

Gear differentials used in automobiles interconnect an input shaft to two output shafts. The input shaft is connected to a differential housing that is rotatable about a common axis of the two output shafts. Carried within the housing is a planetary gear set that interconnects the two output shafts for opposite directions of relative rotation. Front differentials connect a front (input) drive shaft to two front (output) axle halves, rear differentials connect a rear (input) drive shaft to two rear (output) axle halves, and center differentials connect an input shaft to the front and rear (output) drive shafts.

Ordinarily, the planetary gearing of at least front and rear differentials interconnects the two output shafts at a speed ratio of minus one. At such a speed ratio, a single rotation of one output shaft with respect to the housing produces a single rotation of the other output shaft in an opposite direction with respect to the housing. In this way, the two output shafts can rotate at different speeds, which average to the rotational speed of the housing.

While rotating at such different speeds (i.e., differentiating), input torque is divided between the output shafts in accordance with the efficiency of the planetary gear interconnection. A ratio of the torques between two relatively rotating output shafts is referred to as a "bias ratio". The same ratio of torques (or a little larger) is required to initiate differentiation. Reduced efficiency of the interconnection between output shafts permits uneven torque distributions between the output shafts up to the bias ratio at which differentiation is initiated. Bias ratios of two-to-one or more make better use of uneven traction by preventing lower traction drive wheels from spinning until at least two times more torque is distributed to the higher traction drive wheels.

Automotive differentials operate within a matrix of four different modes of loading. Each of the modes is a combination of a direction of torque transfers between the input and output shafts (i.e., drive or coast loading) and a direction of torque transfers between the two output shafts.

Ordinarily, differentials are thought to exhibit the same bias ratio in all four loading modes. However, some worm gear differentials exhibit bias ratio imbalances in opposite directions of torque transfer between the two output shafts. Such imbalances can be useful in center differentials for favoring torque distributions to either the front drive shaft or the rear drive shaft but are generally undesirable for opposite directions of torque transfer between axle halves of front and rear differentials. Several commonly owned patents deal with such imbalances including U.S. Pat. No. 4,191,071 to Gleasman et al.; U.S. Pat. Nos. 4,805,487 and 4,890,511 to Pedersen; and U.S. Pat. No. 5,232,415 to Brewer et al.

Generally, such bias ratio imbalances have been controlled by regulating either frictional characteristics or loading of gear mounting surfaces that contribute more to the bias ratio in one direction of torque transfer than the other. Increasing friction or loading at such mounting surfaces increases the bias ratio imbalance, whereas decreasing friction or loading decreases the bias ratio imbalance.

Variations in speed ratio between output shafts have also been used to imbalance bias ratios in opposite directions of torque transfer between output shafts. In a frictionless system, torque is distributed between the two output shafts in inverse proportion to the absolute speed ratio. However, friction supports a much wider range of torque distributions between the output shafts, so the overall effect of the change in speed ratio is a bias ratio imbalance between the opposite directions of output shaft torque transfer. Co-owned U.S. Pat. No. 2,859,641, to Gleasman discloses a speed ratio change in a center differential to favor torque distributions to either a front or a rear drive shaft. German Patent 39 06 650 discloses another example with the same objective.

The Brewer et al. patent as well as others including German Patent 40 13 202 have sought to control bias ratios between drive and coast loading directions. Some gear mounting surfaces are loaded in only the drive loading direction and other of the gear mounting surfaces are loaded in only the coast loading direction. Accordingly, varying the frictional characteristics of such mounting surfaces varies the bias ratio in one direction of loading (drive or coast) independently of the bias ratio in the other loading direction.

We have discovered that bias ratios can be independently controlled between any one of the four main loading modes. For example, it may be desirable to favor torque distributions to a front drive shaft in a coast mode and a rear drive shaft in a drive mode, so the maximum torque distributions match vehicle weight distributions.

While it is desirable to achieve such bias ratio control, automotive differentials must be inexpensive, compact, and very rugged to operate effectively at reduced efficiencies. Special care must be taken to distribute loads throughout the differentials to avoid producing excessive wear or strain on any one part.

One gearing arrangement we particularly favor mounts both sun and side gear members of a planetary gear set on parallel axes. The sun gear members, more generally referred to as "side" gears, are coupled to inner ends of the output shafts. The planet gear members of the same set are mounted in pairs. One meshing portion of each planet gear engages one of the side gears, and another meshing portion of each planet gear engages its paired planet gear.

Commonly owned U.S. Pat. No. 5,122,101 to Tseng discloses an example of a parallel-axis gear differential in which the planet gears are formed by two gear sections separated by a stem. One of the gear sections has a first meshing portion engaged with one of the side gears and a second meshing portion engaged with its paired planet gear. The other gear section has a third meshing portion that is also engaged with its paired planet gear. The two meshes between the paired planet gears straddle the two meshes between the planet gears and the side gears to provide for a better balance of loading throughout the differential.

Ordinarily, the two side gears are positioned together between the straddled planet gear meshes. However, the side gears can also be separated to provide room for a fixed spacer or a driving block for connecting a coaxial input shaft to the differential housing. Commonly owned U.S. Pat. No. 5,292,291 to Ostertag discloses one example in which the stem sections of the planet gears are lengthened to straddle the spacing between side gears. However, U.S. Pat. No. 5,492,510, issued to one of the subject inventors, uses the additional planet gear length to support another meshing portion between the planet gears. The new meshing portion can be arranged either as a third meshing portion between planet gears or as a replacement for one of the two straddled planet gear meshing portions.

SUMMARY OF INVENTION

Our invention seeks to provide improved control over bias ratios in different loading modes of differentials. A differential is arranged with frictional interfaces that uniquely influence bias ratios in the different loading modes, and a friction modifier is located at one or more of the interfaces to vary bias ratios between the operating modes.

One version of our invention is especially compact for achieving these objectives. The differential includes a housing rotatable about a common axis of the pair of output shafts. The housing has a main body and two ends. A pair of side gears is positioned in the housing for rotation with the output shafts about the common axis. At least one pair of planet gears interconnects the side gears for opposite directions of relative rotation. The planet gears, which rotate about axes parallel to the common axis, mesh with the side gears in a first region along the common axis and mesh with each other in a second region along the common axis. A friction modifier is located within the second region between a first of the side gears and a first of the ends of the housing for varying bias ratios in opposite directions torque transfer between the output shafts.

Preferably, the friction modifier includes relatively rotatable plates that are alternately coupled to the housing and the first side gear. The plates do not add to housing length because the plates are located within a space that is overhung by the intermeshing planet gears. Other types of friction modifiers including friction coatings and conically shaped interfaces could also be located in the same space.

Another example of our differential includes a similar housing and side gears. However, each of said planet gears has three meshing portions—one meshing portion in engagement with one of the side gears and two meshing portions in engagement with its paired planet gear. The two meshing portions of the planet gear pairs straddle at least one of the side gears along the common axis. A spacer is located between the side gears and is fixed against movement along the common axis. A friction modifier located between the spacer and one of the side gears varies bias ratios in opposite directions of torque transfer between output shafts in one of the drive and coast loading directions independently of the other of the drive and coast loading directions.

More than one friction modifier can be used to influence bias ratios in opposite directions of output shaft torque transfers in both the drive and the coast loading directions. First and second side gears are respectively coupled to first and second output shafts. Each of the side gears has inner and outer end faces that are engaged with the housing, forming respective inner and outer frictional interfaces. The inner frictional interfaces are engaged in one of the drive and coast loading directions, and the outer frictional interfaces are engaged in the other of the drive and coast loading directions.

The inner and outer frictional interfaces of the first side gear contribute greater resistance to torque transfers from the second output shaft to the first output shaft than from the first output shaft to the second output shaft. The inner and outer frictional interfaces of the second side gear contribute greater resistance to torque transfers from the first output shaft to the second output shaft than from the second output shaft to the first output shaft. A first friction modifier is located at one of the inner frictional interfaces, and a second friction modifier is located at one of the outer frictional interfaces. The two modifiers independently control bias ratio imbalances between output shaft torque transfers in both drive and coast loading directions.

DRAWINGS

DETAILED DESCRIPTION

Figure 1:
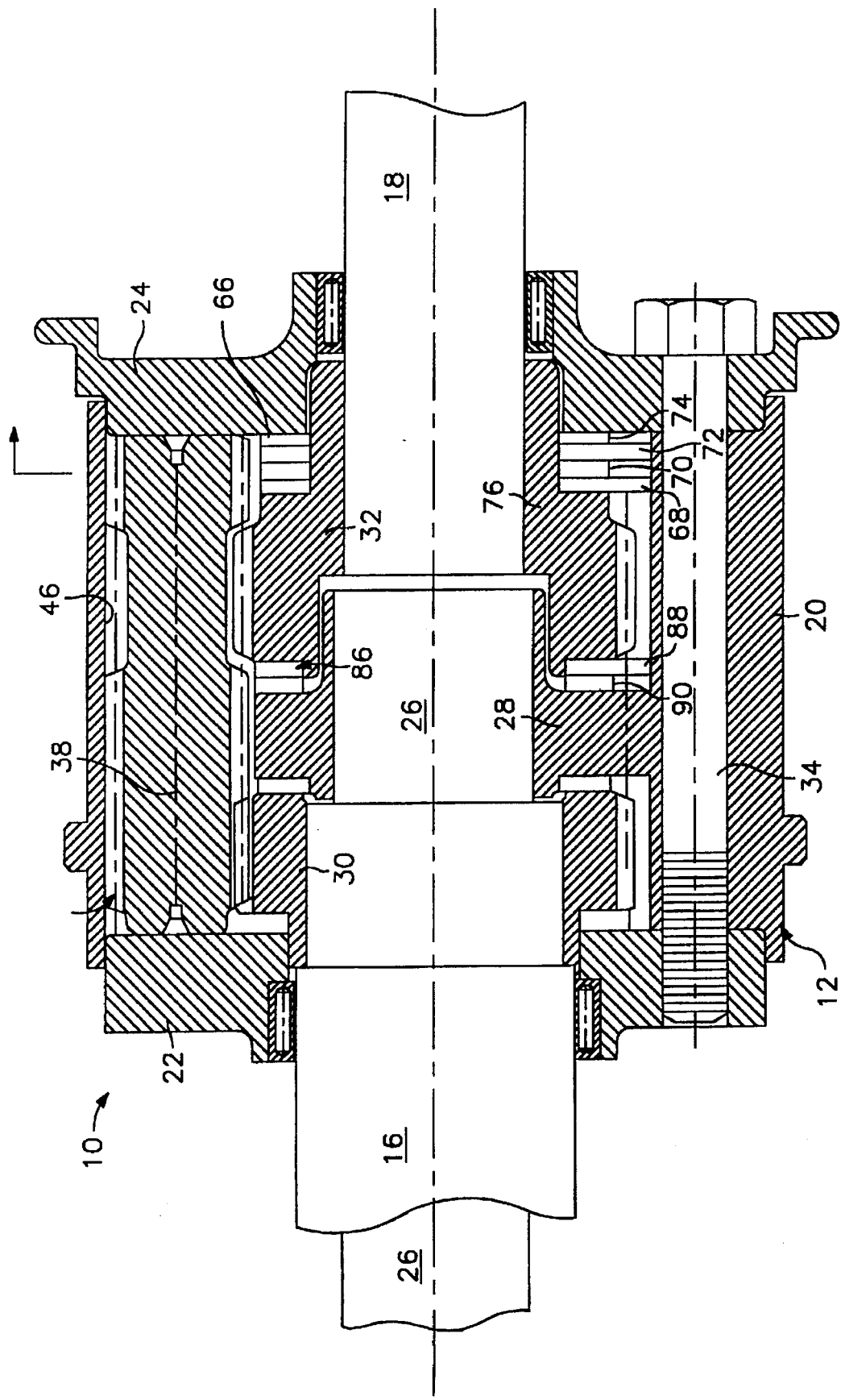
FIG. 1 is an axial cross-sectional view of a differential arranged in accordance with our invention.
Figure 2:
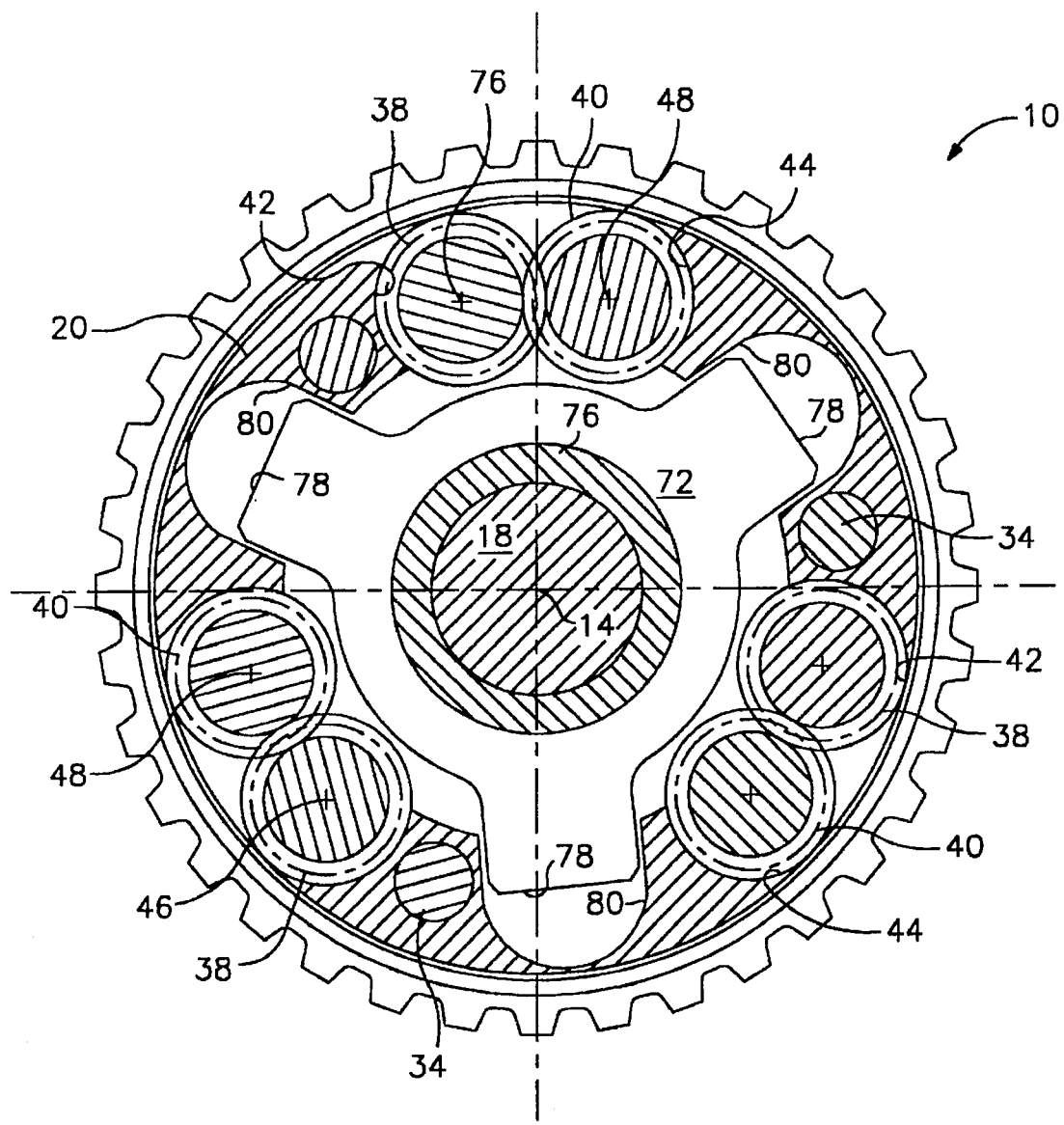
FIG. 2 is a transverse cross-sectional view along line A—A of FIG. 1.

Pictured in FIGS. 1 and 2 is a parallel-axis gear differential 10 having a housing 12 that is rotatable around a common axis 14 of a pair of output shafts 16 and 18. The housing 12 has a main body 20 and two end caps 22 and 24 that are securely attached to the main body by bolts 34. However, the housing 12 could be constructed in a variety of different ways including forming at least one of the end caps 22 and 24 integral with the main body 20 and splitting the main body 20 into two halves.

An input shaft 26, which is also rotatable about the common axis 14, is coupled to a spacer web 28 within the main body 20 of the housing for delivering drive power to the housing. Although the spacer web 28 is preferably an integral part of the housing 12, the spacer block could also be constructed as a separate piece such as a driving block. The input shaft 26 enters the housing 12 within a hollow center of the output shaft 16. Drive power could also be delivered to the housing 12 in a more conventional manner by mounting a ring gear (not shown) on the housing and driving the ring gear with a pinion gear carried by the input shaft. The housing can be journalled directly to a vehicle frame (also not shown) or indirectly to the frame through the input and output shafts.

Within the housing 12 is a pair of side gears 30 and 32 that are respectively coupled to the output shafts 16 and 18. The side gears 30 and 32 have helical teeth with opposite hand helix angles so that both side gears 30 and 32 are thrust inwardly toward the spacer web 28 in one direction (e.g., drive direction) of torque transfer between the input shaft 26 and the output shafts 16 and 18 and are thrust outwardly toward the end caps 22 and 24 in the other direction (e.g., coast direction) of torque transfer between the input shaft 26 and the output shafts 16 and 18.

Figure 3:
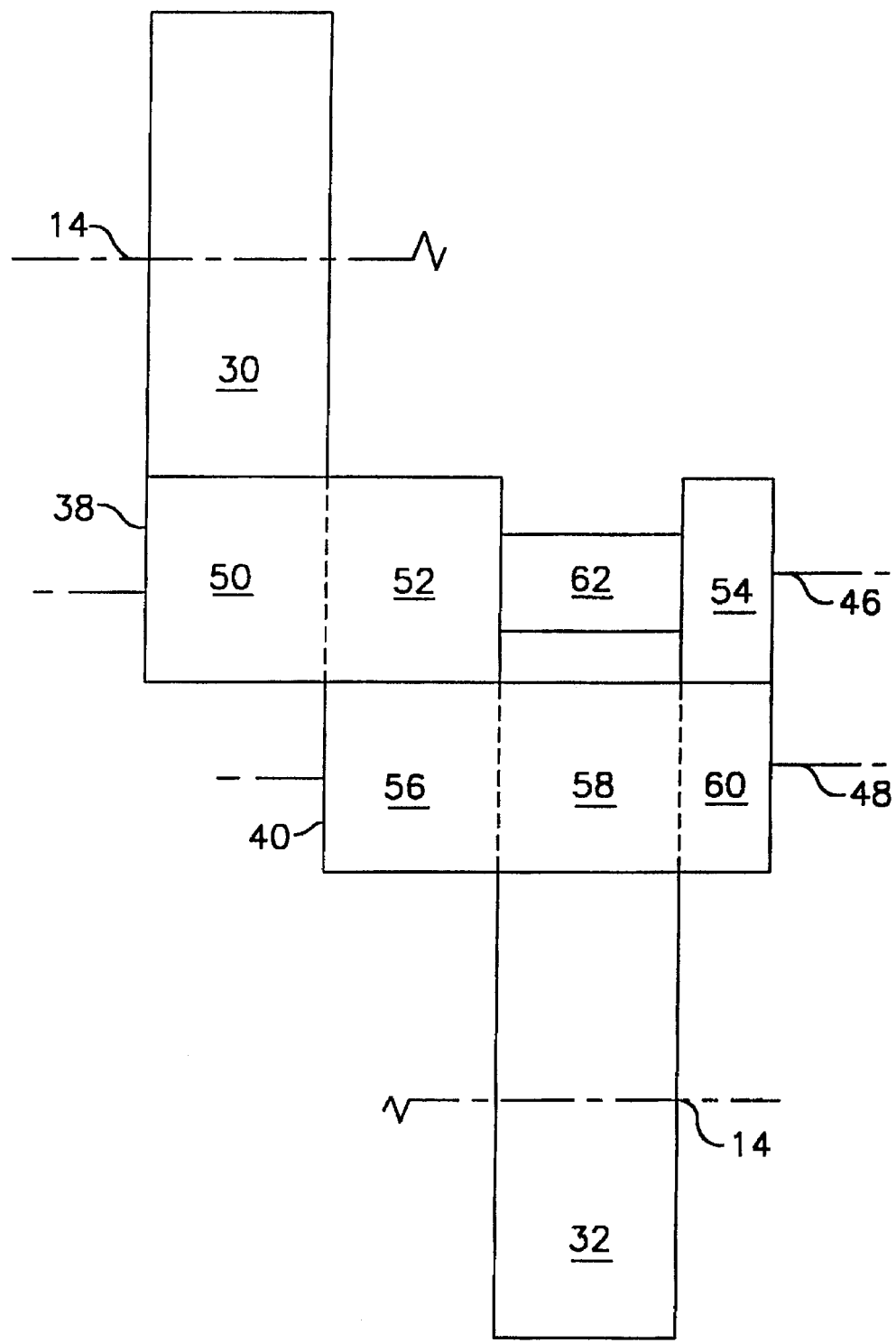
FIG. 3 is a gear diagram in which a common axis of a pair of side gears is split to enable the side gears to be rolled about respective members of a planet gear pair into a common viewing plane.

The side gears 30 and 32 are interconnected by three pairs of planet gears 38 and 40 that are journalled on their outside diameter surfaces in respective pockets 42 and 44 for rotation about axes 46 and 48 that extend parallel to the common axis 14. The operative connection of one of the planet gear pairs is shown schematically in FIG. 3 in which the common axis has been split to roll all of the gears into a common viewing plane. The planet gear 38 has a first meshing portion 50 in engagement with the side gear 30 and second and third meshing portions 52 and 54 in engagement with its paired planet gear 40. The planet gear 40 has a first meshing portion 58 in engagement with the side gear 32 and second and third meshing portions 56 and 60 in engagement with the second and third meshing portions 52 and 54 of the planet gear 38. The meshing portions 52 and 54 of the planet gear 38 are separated by a stem section 62 to straddle the side gear 32. The four meshes 30/50, 52/56, 58/32, and 54/60 occupy respective regions along the common axis 14.

The planet gears 38 and 40 could also be made with additional meshing portions engaging each other. For example, both planet gears 38 and 40 could be extended to overhang the side gear 30. This would require the addition of a stem section in the planet gear 40 to straddle the side gear 30. More detailed examples of such gearing configurations are disclosed in U.S. Pat. No. 5,292,291 to Ostertag and U.S. Pat. No. 5,492,510 to Bowerman, which are both hereby incorporated by reference. Alternatively, the planet gears could be made with only one planet gear-to-planet gear meshing portion, such as by eliminating the meshing portions 52 and 56 located along the common axis 14 between the side gears 30 and 32.

Returning to FIGS. 1 and 2, a first friction modifier 66 is located between the side gear 32 and the end cap 24 within a region of the common axis that is overhung by the planet gears 38 and 40. Thus, the friction modifier 66 does not add to the overall length of the differential or the space between the end caps 22 and 24. Two friction plates 68 and 72 (i.e., relatively moveable elements) of the friction modifier 66 are coupled to the main body 20 for rotation with the housing 12, and the remaining two friction plates 70 and 74 are coupled to an outer hub portion 76 of the side gear 32 for rotation with the side gear 32. All four friction plates are compressible between the side gear 32 and the end cap 24 forming a friction clutch for generating frictional resistance to relative rotation between the side gear 32 and the housing 12.

The friction plates 68 and 72 are coupled to the main body 20 with tabs 78 that engage complementary shaped recesses 80 in the main body 20. The friction plates 70 and 74 are splined to the side gear hub 76. Each of the friction plates adds a frictional interface opposing relative rotation between the side gear 32 and the housing 12 based on the same normal loading force generated by the side gear thrust. Thus, the four frictional plates 68, 70, 72, and 74 can generate a frictional torque that is five or more times the frictional torque that can be generated between the side gear 32 and end cap 24 alone.

The friction modifier 66 could also be supplemented or replaced by friction coatings used to better control coefficients of friction at the interfaces between the side gear 32 and end cap 24. The overall interface could also be formed with a conical shape to raise reactionary forces at the interface required to counteract the side gear thrust forces.

A second smaller friction modifier 86 is located between the side gear 32 and the spacer web 28. One friction plate 88 is coupled to the housing 12 similar to the friction plates 68 and 72, and another friction plate 90 is coupled to an inner hub 92 of the side gear 32 similar to the friction plates 70 and 74. The spacer web 28, being an integral part of the housing 12, opposes inward thrust forces generated by the side gear 32 for compressing the friction plates 88 and 90. The friction modifier 86 functions similar to the friction modifier 66 but is engaged by an opposite direction of torque transfer between the input shaft 26 and the output shafts 16 and 18.

However, both friction modifiers 66 and 86 result in a greater resistance to torque transfers from the output shaft 16 to the output shaft 18 than from the output shaft 18 to the output shaft 16. This is because the friction modifiers 66 and 86 reduce the amount of torque transmitted by the side gear 32 during torque transfers from the output shaft 18 to the output shaft 16 but do not limit the amount of torque transmitted by the side gear 32 during torque transfers from the input shaft 16 to the output shaft 18. The thrust force effective for compressing the friction modifiers 66 and 86 is a function of the amount of torque transmitted by the side gear 32.

A simplified mathematical model explains this phenomena. The model assumes (a) friction is limited to a single interface at one end or the other of the side gear 32, (b) the side gear 32 has a 45 degree helix angle and a pitch radius equal to unity, and (c) the effective friction radius of the interface is also equal to unity. For torque transfers from the output shaft 16 to the output shaft 18, the relationship between the torques TL and TR of the output shafts 16 and 18 and the torque TS of the side gear 32 is as follows:

$$TL=TS \quad TR=TS-TS\mu$$

where "$\mu$" is an effective coefficient of friction of the side gear interface.

Torque transfers from the output shaft 18 to the output shaft 16 are related to the side gear torque TS as follows:

$$TR=TS+TS\mu \quad TL=TS$$

By simplification, the two bias ratios for opposite directions of torque transfer between the output shafts 16 and 18 compare as follows:

$$\frac{TL}{TR} = \frac{1}{1-\mu} \quad \frac{TR}{TL} = \frac{1+\mu}{1}$$

The two friction modifiers 66 and 86 at opposite ends of the side gear 32 provide higher bias ratios during torque transfers from the output shaft 16 to the output shaft 18 in both directions of torque transfer between the input shaft 26 and the two output shafts 16 and 18. For example, the differential 10 could be arranged as a center differential with the output shaft 16 functioning as a drive shaft to the front axle and the output shaft 18 functioning as a drive shaft to the rear axle. Higher torque distributions to the front axle would be possible in both drive and coast directions of loading.

Such an arrangement could be used to significantly enhance the performance of all wheel drive vehicles. For example, vehicle stability can be improved by preventing both drop-throttle oversteering and power oversteering during cornering maneuvers. In the case of drop-throttle oversteering, weight transfers from the rear axle to the front axle, leaving the rear axle with much less available traction to withstand engine braking forces and retain lateral stability. However, a high bias ratio can be used to distribute a much greater percentage of the engine braking forces to the front axle to avoid skidding by the rear wheels. In the case of power oversteering, the usually slower rotating rear wheels reach a limit of traction and begin to rotate at least as fast as the front wheels, causing oversteering. A high bias ratio favoring torque distributions to the front axle limits the oversteer moment by shifting torque away from the rear axle.

The remaining FIGS. 4–7 include examples of other possible combinations of the friction modifiers. All four of the remaining figures depict a simplified housing 92 rotatable about a common axis 94 of a pair of output shafts 96 and 98. Side gears 100 and 102 having opposite hand helix angles are coupled to the respective output shafts 96 and 98. A spacer web 104 of the housing 92 separates the side gears 100 and 102. The planet gears are not shown.

The two helix angles of the side gears 100 and 102 are selected so that the two side gears 100 and 102 are thrust inwardly in a drive direction of torque transfer from the housing 92 to the output shafts 96 and 98 and are thrust outwardly against opposite ends 106 and 108 of the housing 92 in a coast direction of torque transfer from the two output shafts 96 and 98 to the housing 92. Also, the friction modifiers are assumed to increase friction.

Figure 4:
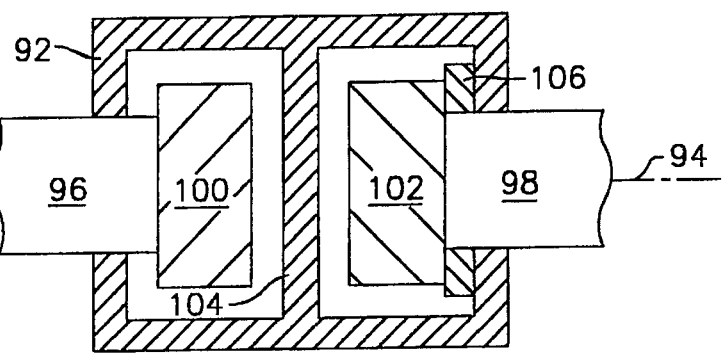
FIGS. 4–7 are schematic illustrations of a housing and two side gears connected to respective output shafts showing alternative arrangements of friction modifiers.
Figure 5:
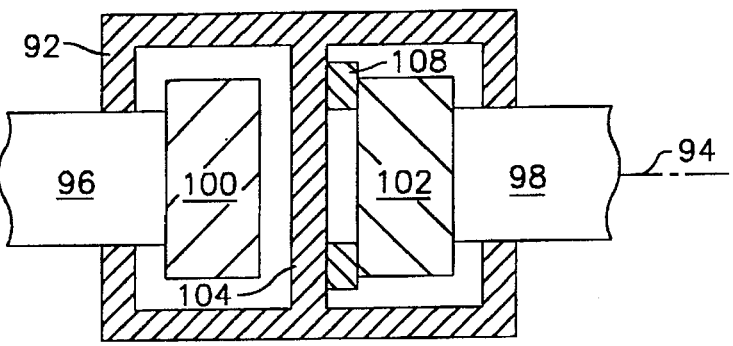

In FIG. 4, a single friction modifier 106 is located between an outer end face of the side gear 102 and one end of the housing 92. The friction modifier 106 supports a larger distribution of torque to the output shaft 96 in the coast direction of loading. A single friction modifier 108 in FIG. 5 is located between an inner end face of the side gear 102 and the spacer web 104. The output shaft 96 still is the potential for higher loading than the output shaft 98 but only in the drive direction of loading.

Figure 6:
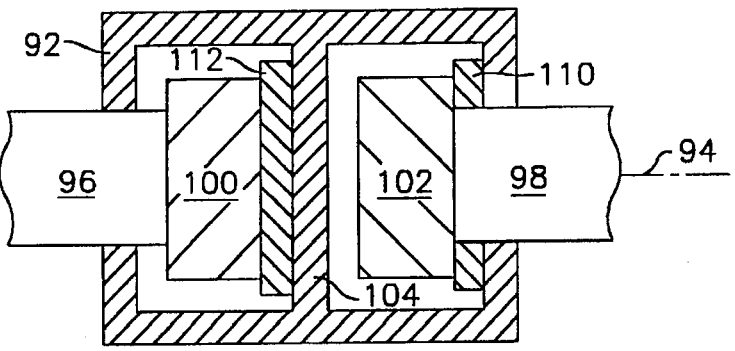

Two friction modifiers 110 and 112 are used in FIG. 6 to affect torque distributions in both drive and coast loading directions. For example, the friction modifier 110 functions similar to the friction modifier 106 in FIG. 4 by supporting a larger distribution of torque to the output shaft 96 in the coast direction of loading. The friction modifier 112 supports a larger distribution of torque to the output shaft 98 in the drive direction of loading.

Figure 7:
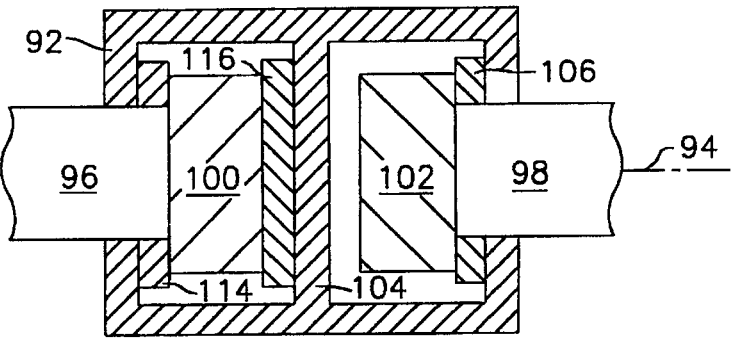

Three friction modifiers 114, 116, and 118 are used in FIG. 7 to affect torque distributions. Only one of the side gear end faces lacks a friction modifier, and this interface is located between the side gear 102 and the spacer web 104. Accordingly, the bias ratio for transfers from the output shaft 96 to the output shaft 98 in the drive direction of loading is less than the bias ratios for all of the remaining direction of torque transfer including either direction of output shaft transfer in the coast direction of loading.

Similar effects, which will now be well understood by those of skill in the art, would be possible by assuming that the side gears are thrust outwardly in the drive mode and inwardly in the coast mode or that the friction modifier reduces friction. The output shafts can direct torque to front and rear drive axles or to the axle halves of the front or rear axles.

We claim:

1. A differential for varying torque distributions between a pair of output shafts associated with opposite directions of torque transfer between the output shafts comprising:

a housing having a main body and two ends rotatable about a common axis of the pair of output shafts;

said housing having an axial length that extends along the common axis between said two ends;

a pair of side gears positioned in said housing for rotation with the output shafts about the common axis;

at least one pair of planet gears positioned in said housing for rotation about axes parallel to the common axis and interconnecting said side gears for opposite directions of relative rotation;

said planet gears being in meshing engagement with said side gears in a first region along the common axis and said planet gears being in meshing engagement with each other in a second region along the common axis;

said second region within which said planet gears are in meshing engagement with each other being located along the common axis between a first of said side gears and a first of said ends of the housing;

a first friction modifier for varying torque distributions between the output shafts associated with the opposite directions of output shaft torque transfers; and said first friction modifier also being located within said second region between said first side gear and said first end of the housing so that said friction modifier is located in the same position along the common axis as the meshing engagement between planet gears within the second region of the common axis.

2. The differential of claim 1 in which said first friction modifier includes first and second relatively moveable elements, said first relatively moveable element being coupled for rotation with said first side gear and said second relatively moveable element being coupled for rotation with said housing.

3. The differential of claim 1 further comprising pairs of pockets surrounding said side gears and supporting outer diameter surfaces of the planet gears.

4. The differential of claim 3 in which said second relatively moveable element extends radially into engagement with said housing body between said pockets.

5. The differential of claim 1 in which said side gears are separated by a spacer that is fixed against movement along the common axis.

6. The differential of claim 5 in which a second friction modifier is located between said spacer and said first side gear for varying torque distributions between the output shafts associated with the opposite directions of output shaft torque transfers.

7. The differential of claim 6 in which said second friction modifier also includes first and second relatively moveable elements, said first relatively moveable element of the second friction modifier being coupled for rotation with said first side gear and said second relatively moveable element of the second friction modifier being coupled for rotation with said housing.

8. The differential of claim 6 in which said planet gears also mesh with each other in a third region along the common axis between said side gears.

9. A differential exhibiting bias ratios associated with opposite directions of torque transfer between a pair of output shafts in both drive and coast loading directions comprising:

a housing rotatable about a common axis of the pair of output shafts for transmitting torque from the housing to the output shafts in the drive direction of loading and for transmitting torque from the output shafts to the housing in the coast direction of loading;

a pair of side gears positioned in said housing for rotation with the output shafts about the common axis;

at least one pair of planet gears positioned in the housing for rotation about respective axes that extend parallel to the common axis;

each of said planet gears having a first meshing portion in engagement with one of said side gears and second and third meshing portions in engagement with respective meshing portions of its paired planet gear;

said engaged second and third meshing portions of the planet gears straddling at least one of said side gears along the common axis;

a spacer located between said side gears and fixed against movement along the common axis; and a first friction modifier located between said spacer and one of said side gears along the common axis for varying bias ratios between opposite directions of torque transfer between the output shafts in one of the drive and coast loading directions independently of the other of the drive and coast loading directions.

10. The differential of claim 9 in which said side gears move together along the common axis in response to transmissions of torque in one of the drive and coast loading directions and move apart along the common axis in response to transmissions of torque in the other of the drive and coast loading directions.

11. The differential of claim 10 in which a second friction modifier is located between one of said side gears and the housing along the common axis for varying bias ratios between opposite directions of output shaft torque transfers in one of the drive and coast loading directions independently of the other of the drive and coast loading directions.

12. The differential of claim 11 in which said first friction modifier is located between said spacer and one of said side gears and said second friction modifier is located between the other of said side gears and said housing.

13. The differential of claim 10 in which said side gears straddle said engaged second meshing portions of the planet gears along the common axis.

14. The differential of claim 13 in which said spacer functions as a driving block for transmitting torque to the housing from a vehicle engine.

15. An automotive differential for connecting an input shaft to first and second relatively rotatable output shafts and having a matrix of four modes of loading which combine directions of torque transfer between the input and output shafts with directions of torque transfer between the first and second output shafts comprising:

a differential housing rotatable about a common axis of the first and second output shafts for transmitting torque from the input shaft to the output shafts in a drive direction of loading and for transmitting torque from the output shafts to the input shaft in a coast direction of loading;

a pair of first and second side gears positioned in said housing for rotation with the output shafts about the common axis;

a spacer located between said side gears and fixed against both movement along the common axis and relative rotation with respect to said housing around the common axis;

at least one pair of planet gears for operatively interconnecting said side gears;

said first and second side gears having inner end faces engageable with said spacer forming respective inner frictional interfaces and having outer end faces engageable with said housing forming respective outer frictional interfaces;

said inner frictional interfaces being engaged in response to torque transfers in one of the drive and coast loading directions and being not engaged in the other of the drive and coast loading directions;

said outer friction interfaces being engaged in response to torque transfers in the other of the drive and coast loading directions and being not engaged in the one of the drive and coast loading directions;

said inner and outer frictional interfaces of the first side gear contributing greater resistance to torque transfers from the second output shaft to the first output shaft than from the first output shaft to the second output shaft;

said inner and outer frictional interfaces of the second side gear contributing greater resistance to torque transfers from the first output shaft to the second output shaft than from the second output shaft to the first output shaft;

a first friction modifier located at one of said inner frictional interfaces between said spacer and said inner end face of one of the side gears;

a second friction modifier located at one of said outer frictional interfaces between said housing and said outer end face of one of the side gears; and said first and second friction modifiers vary frictional resistance to torque transfers between the output shafts in both the drive and coast loading directions.

16. The differential of claim 15 in which said first friction modifier is located at said inner frictional interface of the first side gear and said second friction modifier is located at said outer frictional interface of the second side gear.

17. The differential of claim 16 in which said first friction modifier increases friction for further resisting torque transfers from the second output shaft to the first output shaft in the one of the drive and coast loading directions and said second friction modifier increases friction for further resisting torque transfers from the first output shaft to the second output shaft in the other of the drive and coast loading directions.

18. The differential of claim 15 in which said first friction modifier is located at said inner frictional interface of the first side gear and said second friction modifier is located at said outer frictional interface of the first side gear.

19. The differential of claim 18 in which said first and second friction modifiers increase friction at their respective interfaces for resisting torque transfers from the second output shaft to the first output shaft in both of the drive and coast loading directions.

20. The differential of claim 15 in which said spacer functions as a driving block for transmitting torque between the input shaft and the housing.

21. The differential of claim 20 in which the first output shaft is arranged for connection to a front axle of a vehicle and the second output shaft is arranged for connection to a rear axle of a vehicle.

22. The differential of claim 21 in which said inner frictional interfaces are located between opposite sides of said spacer and said first and second side gears.

23. The differential of claim 22 in which said side gears move together along the common axis in response to transmissions of torque from the input shaft to the output shafts.

24. The differential of claim 22 in which said first friction modifier is located between said spacer and said first side gear.

25. The differential of claim 24 in which said second friction modifier is located at said outer frictional interface of the second side gear.

26. A differential for varying torque distributions between a pair of output shafts associated with opposite directions of torque transfer between the output shafts comprising:

a housing having a main body and two ends rotatable about a common axis of the pair of output shafts;

a pair of side gears positioned in said housing for rotation with the output shafts about the common axis;

at least one pair of planet gears positioned in said housing for rotation about axes parallel to the common axis and interconnecting said side gears for opposite directions of relative rotation;

said planet gears meshing with said side gears in a first region along the common axis and said planet gears meshing with each other in a second region along the common axis;

a first friction modifier located within said second region between a first of said side gears and a first of said ends of the housing for varying torque distributions between the output shafts associated with the opposite directions of output shaft torque transfers;

said side gears being separated by a spacer that is fixed against movement along the common axis; and a second friction modifier located between said spacer and said first side gear for varying torque distributions between the output shafts associated with the opposite directions of output shaft torque transfers.

27. The differential of claim 26 in which said second friction modifier also includes first and second relatively moveable elements, said first moveable element of the second friction modifier being coupled for rotation with said first side gear and said second moveable element of the second friction modifier being coupled for rotation with said housing.

28. The differential of claim 26 in which said planet gears also mesh with each other in a third region along the common axis between said side gears.

29. An automotive differential for connecting an input shaft to first and second relatively rotatable output shafts and having a matrix of four modes of loading which combine directions of torque transfer between the input and output shafts with directions of torque transfer between the first and second output shafts comprising:

- a differential housing rotatable about a common axis of the first and second output shafts for transmitting torque from the input shaft to the output shafts in a drive direction of loading and for transmitting torque from the output shafts to the input shaft in a coast direction of loading;
- a pair of first and second side gears positioned in said housing for rotation with the output shafts about the common axis;
- at least one pair of planet gears for operatively interconnecting said side gears;
- each of said side gears having inner and outer end faces engaged with said housing forming respective inner and outer frictional interfaces;
- said inner frictional interfaces being engaged in response to torque transfers in one of the drive and coast loading directions and being not engaged in the other of the drive and coast loading directions;
- said outer friction interfaces being engaged in response to torque transfers in the other of the drive and coast loading directions and being not engaged in the one of the drive and coast loading directions;
- said inner and outer frictional interfaces of the first side gear contributing greater resistance to torque transfers from the second output shaft to the first output shaft than from the first output shaft to the second output shaft;
- said inner and outer frictional interfaces of the second side gear contributing greater resistance to torque transfers from the first output shaft to the second output shaft than from the second output shaft to the first output shaft;
- a first friction modifier located at one of said inner frictional interfaces;
- a second friction modifier located at one of said outer frictional interfaces for varying frictional resistance to torque transfers between the output shafts in both the drive and coast loading directions;
- said first friction modifier being located at said inner frictional interface of the first side gear and said second friction modifier being located at said outer frictional interface of the second side gear; and
- said first friction modifier increasing friction for further resisting torque transfers from the second output shaft to the first output shaft in the one of the drive and coast loading directions and said second friction modifier increasing friction for further resisting torque transfers from the first output shaft to the second output shaft in the other of the drive and coast loading directions.

* * * * *